Figure 1:
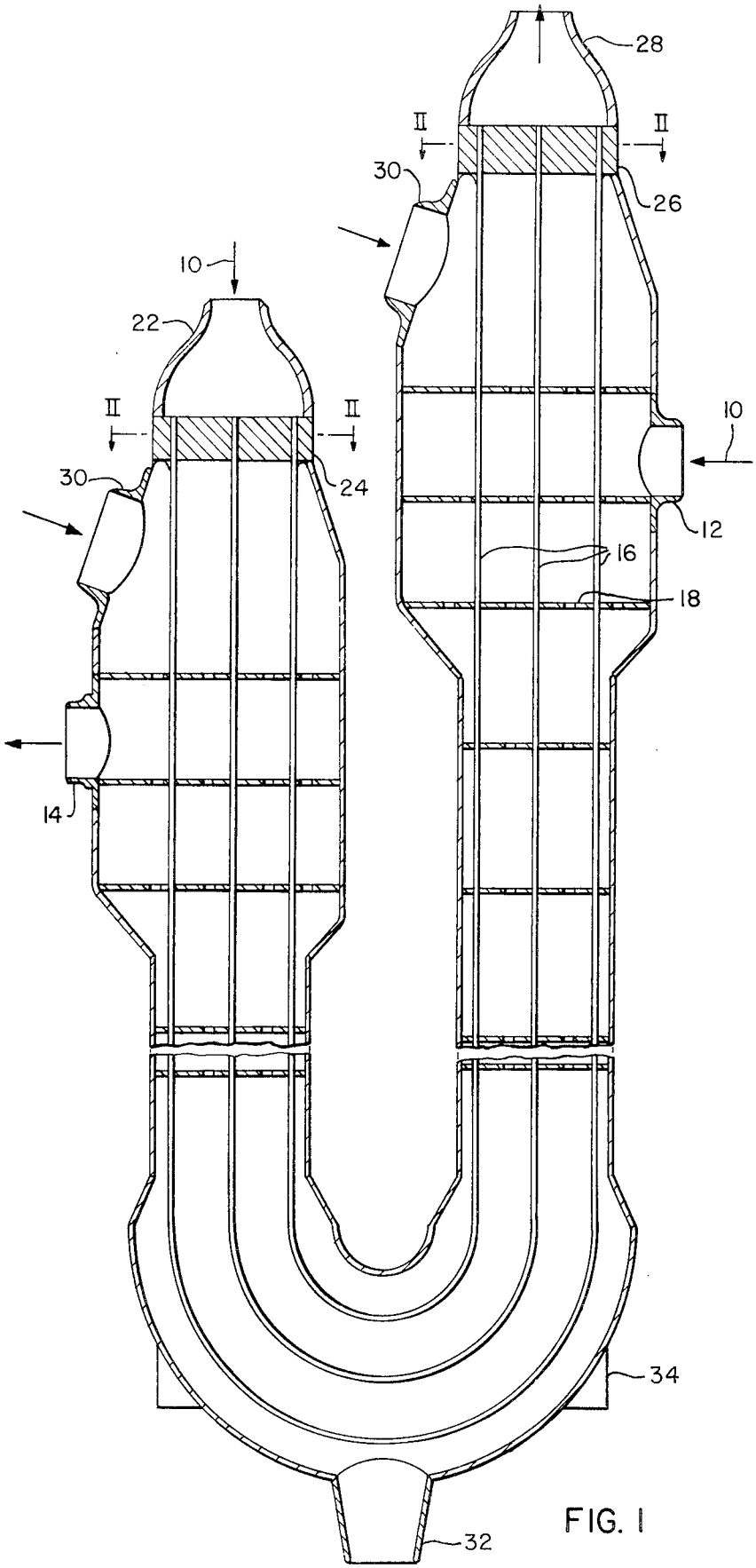
Figure 2:
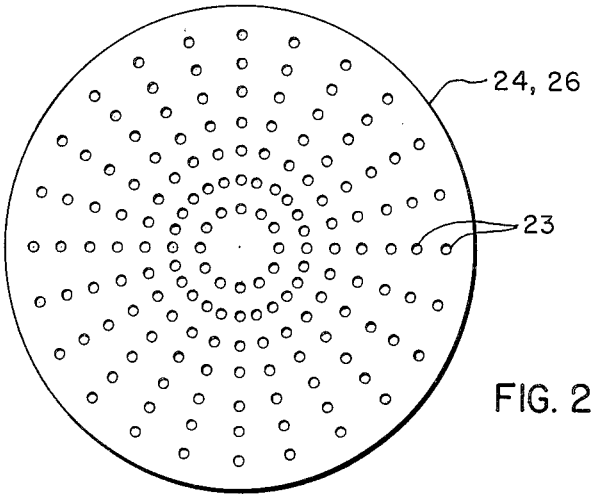
Figure 3:
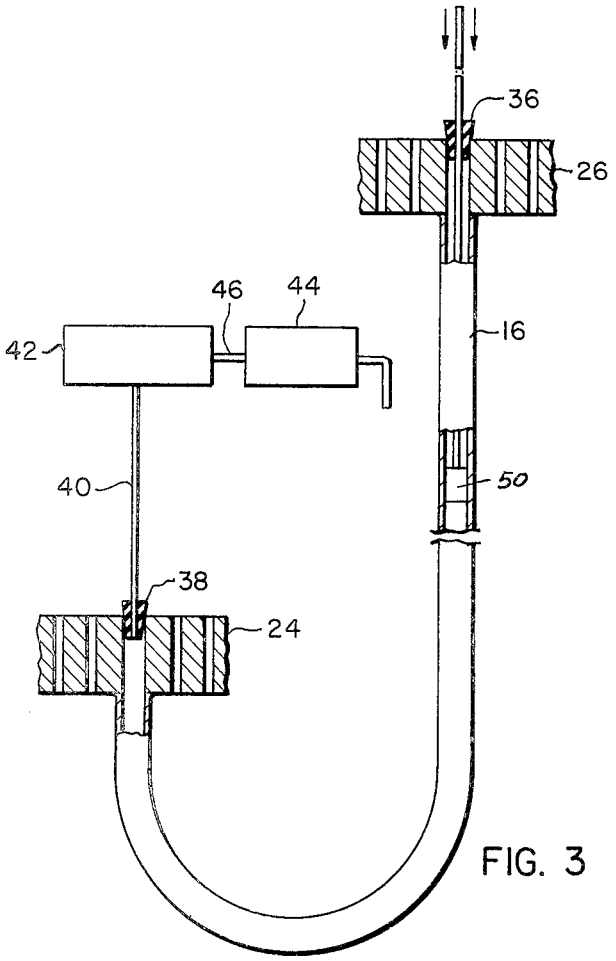
Figure 4:
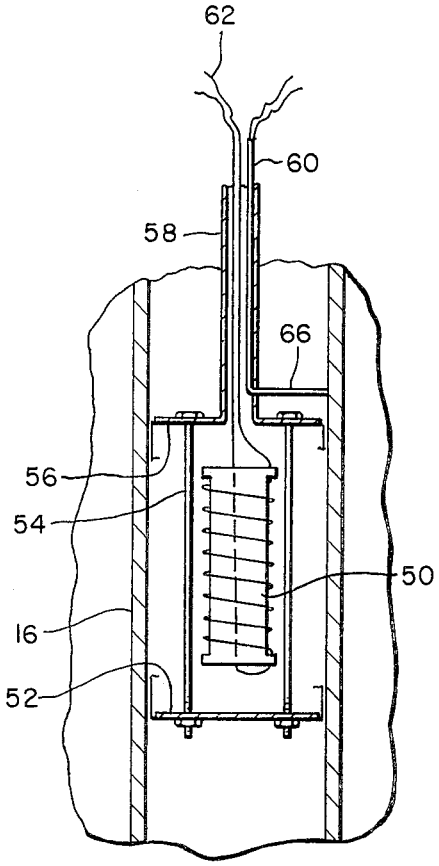
Figure 5:
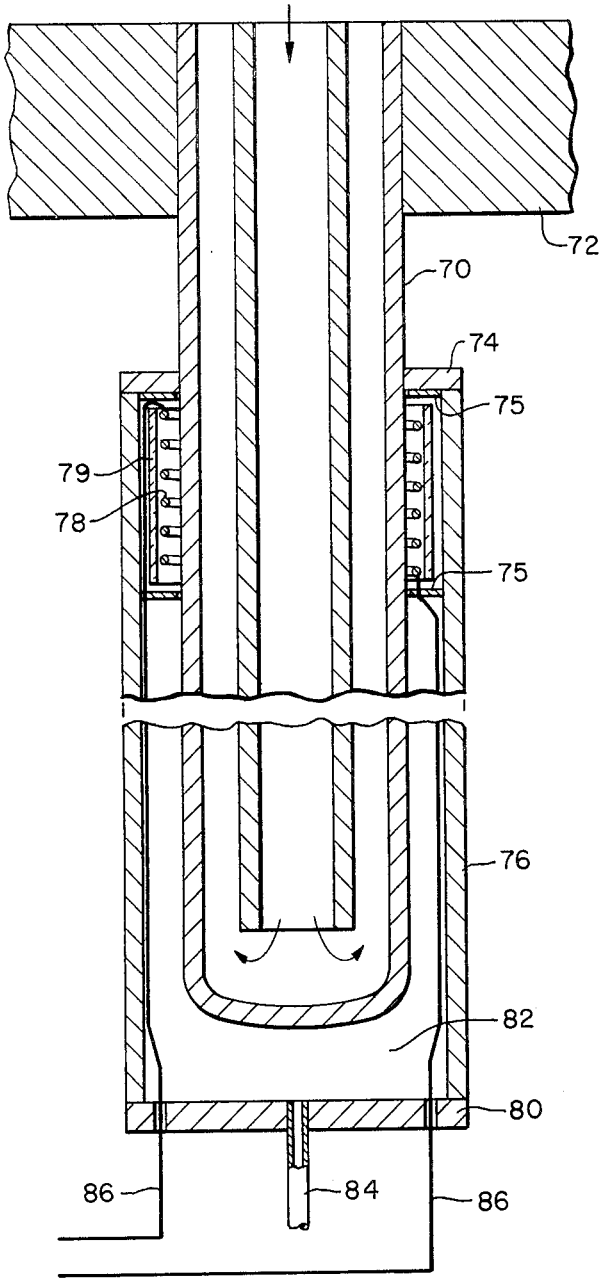

United States Defensive Publication [19] (H) [11] T963,003

Schrock et al. [43] Oct. 4, 1977

[54] METHOD AND APPARATUS FOR LOCATING A DEFECTIVE TUBE OF A LIQUID METAL-TO-WATER TUBE TYPE HEAT EXCHANGER

[75] Inventors: Steven L. Schrock; James D. Mangus, both of Greensburg, Pa.

[73] Assignee: Westinghouse Electric Corportion, Pittsburgh, Pa.

[21] Appl. No.: 676,179

[22] Filed: Apr. 12, 1976

[51] Int. Cl.[2] ..... G01M 3/20

[52] U.S. Cl. ..... 73/40.7

[57] ABSTRACT

A method and apparatus for detecting a specific leaking tube or tubes and for detecting the position of a defect within a tube in a liquid metal-to-water tube type heat exchanger, generally used in a sodium cooled nuclear reactor. Subsequent to draining of the heat exchanger a solid reaction product of the liquid metal and water forms at a leak location. Introducing an inert gas to the exterior of the tubes, creating a pressure differential across the tube wherein the interior pressure is less than the exterior pressure, and heating the tube, provide dissociation and isolation of the reaction product, which, when analyzed for chemical content, indicates which tube or tubes is defective. A heat probe apparatus which traverses the interior of the tubes may be used in the heating step, which, as a result of the speed of the dissociation process at high temperatures provides a means for detecting the specific leak location within the tube. A heat apparatus which traverses the exterior of bayonet type tubes may be used in another embodiment.

19 Claims, 3 Sheets Drawing,

23 Pages Specification

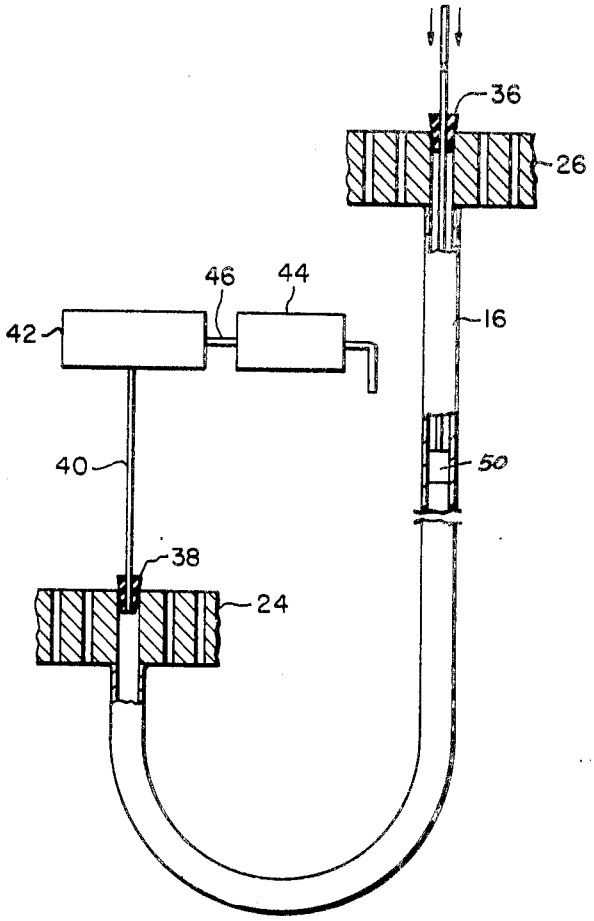

The file of this unexamined application may be inspected and copies thereof may be purchased (849 O.G. 1221, Apr. 9, 1968).